United States Patent
Vallinen et al.

(10) Patent No.: US 8,090,667 B2
(45) Date of Patent: Jan. 3, 2012

(54) CHARGING IN A COMMUNICATION SYSTEM

(75) Inventors: Juha Vallinen, Nokia (FI); Juha-Pekka Koskinen, Hämcenlinna (FI)

(73) Assignee: Intellectual Ventures I LLC, Wilmington, DE (US)

( * ) Notice: Subject to any disclaimer, the term of this patent is extended or adjusted under 35 U.S.C. 154(b) by 1929 days.

(21) Appl. No.: 10/976,895

(22) Filed: Nov. 1, 2004

(65) Prior Publication Data

US 2006/0003734 A1 Jan. 5, 2006

(30) Foreign Application Priority Data

Jun. 30, 2004 (GB) .................................. 0414662.7

(51) Int. Cl.
*G06Q 99/00* (2006.01)
(52) U.S. Cl. ......... 705/400; 455/406; 455/407; 455/408
(58) Field of Classification Search ............. 705/1, 400; 709/206, 207; 719/315; 455/406–408
See application file for complete search history.

(56) References Cited

U.S. PATENT DOCUMENTS

| 6,577,719 B2 * | 6/2003 | Simonen et al. ............. 379/126 |
| 7,221,929 B2 * | 5/2007 | Lee et al. ...................... 455/408 |
| 2002/0068545 A1 | 6/2002 | Oyama et al. ................ 455/406 |
| 2003/0114140 A1 * | 6/2003 | Iivonen et al. ............... 455/406 |
| 2004/0101117 A1 * | 5/2004 | Koskinen et al. ............ 379/126 |
| 2004/0229596 A1 | 11/2004 | Stura et al. ................... 455/406 |
| 2004/0235505 A1 * | 11/2004 | Lee ............................... 455/466 |
| 2004/0252640 A1 * | 12/2004 | Focke ........................... 370/229 |
| 2005/0026558 A1 | 2/2005 | Stura et al. .................. 455/3.06 |

FOREIGN PATENT DOCUMENTS

EP 779733 A2 * 6/1997

OTHER PUBLICATIONS

Garcia-Martin et al., "Multiple recipient Message requests in the Session Initiation Protocol (SIP)," SIPPING Working Group Internet—Draft, May 11, 2004, 10 pages.
Non-Final Office Action on U.S. Appl. No. 12/427,990, mailed Mar. 3, 2011.
Notice of Allowance on U.S. Appl. No. 12/427,990, mailed Aug. 24, 2011.

* cited by examiner

*Primary Examiner* — Akiba Robinson Boyce

(57) ABSTRACT

This invention relates to a method of charging in a communications network, said method comprising including a first charging identity in at least one of a plurality of messages relating to a service, said first charging identity being specific to said at least one message, including a second charging entity in said at least one message, said second charging identity being specific to said service, charging for said service based on at least one of said first and second charging identities.

31 Claims, 5 Drawing Sheets

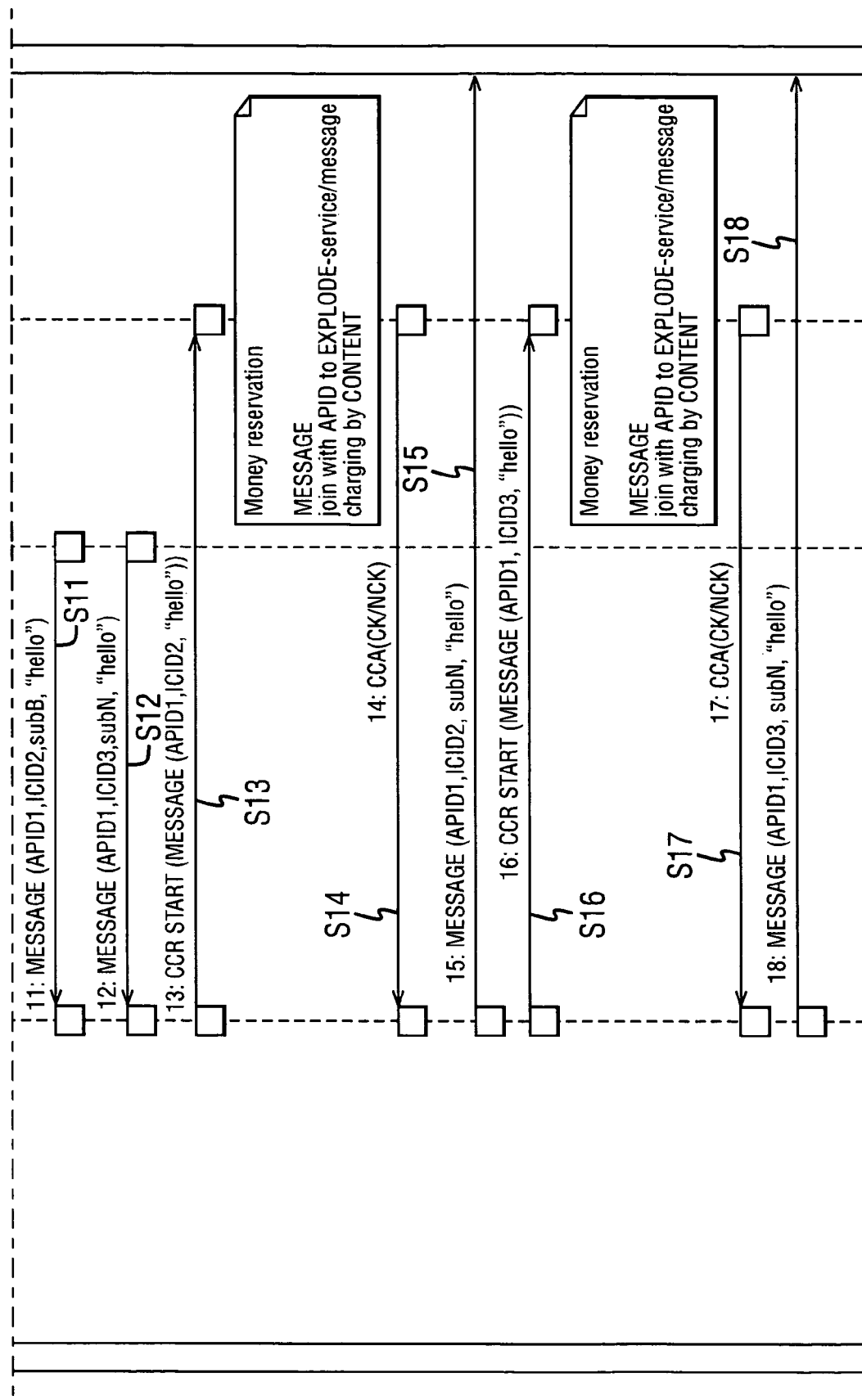
FIG. 2 (Contd.)

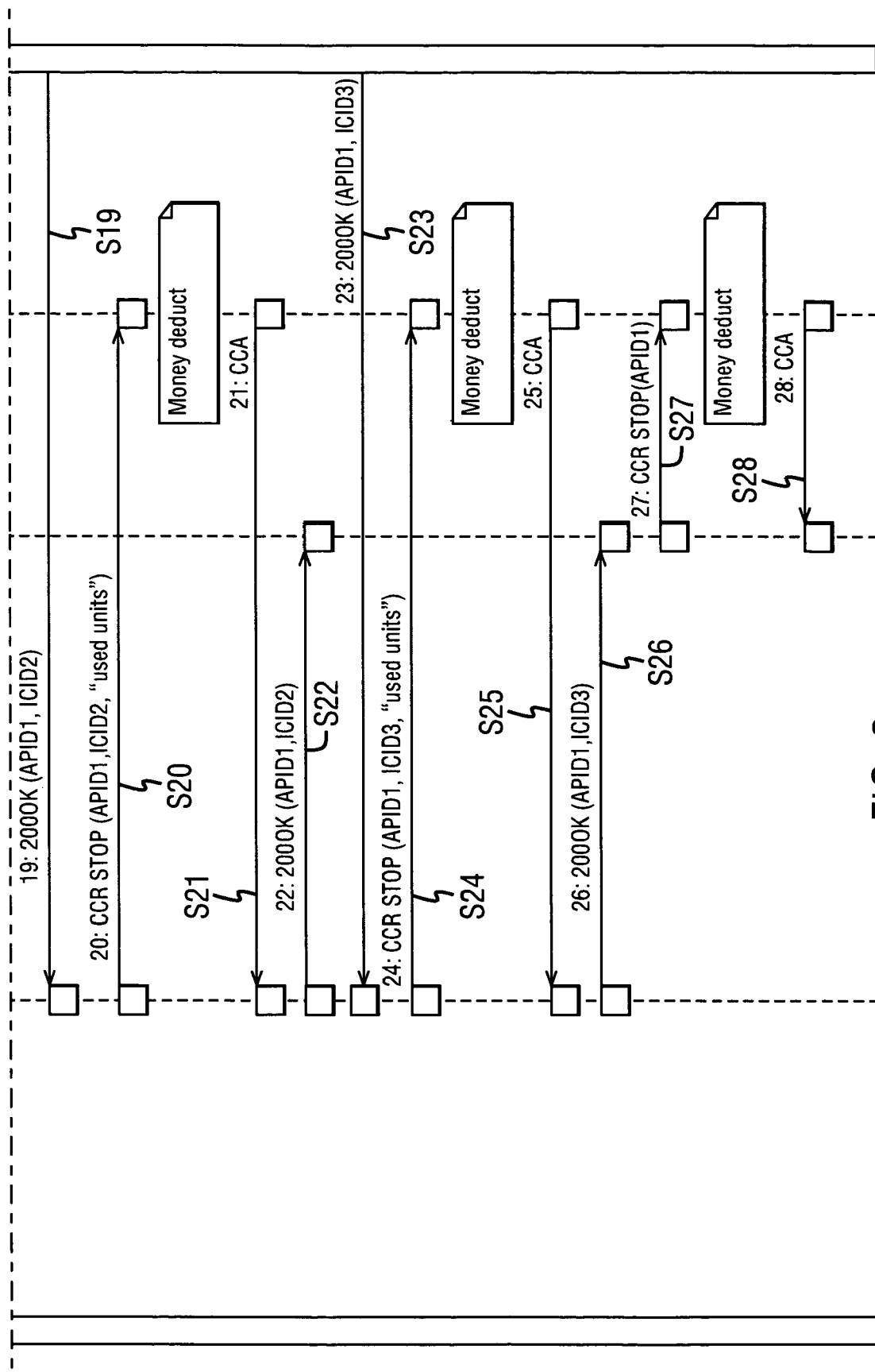
FIG. 2 (Contd.)

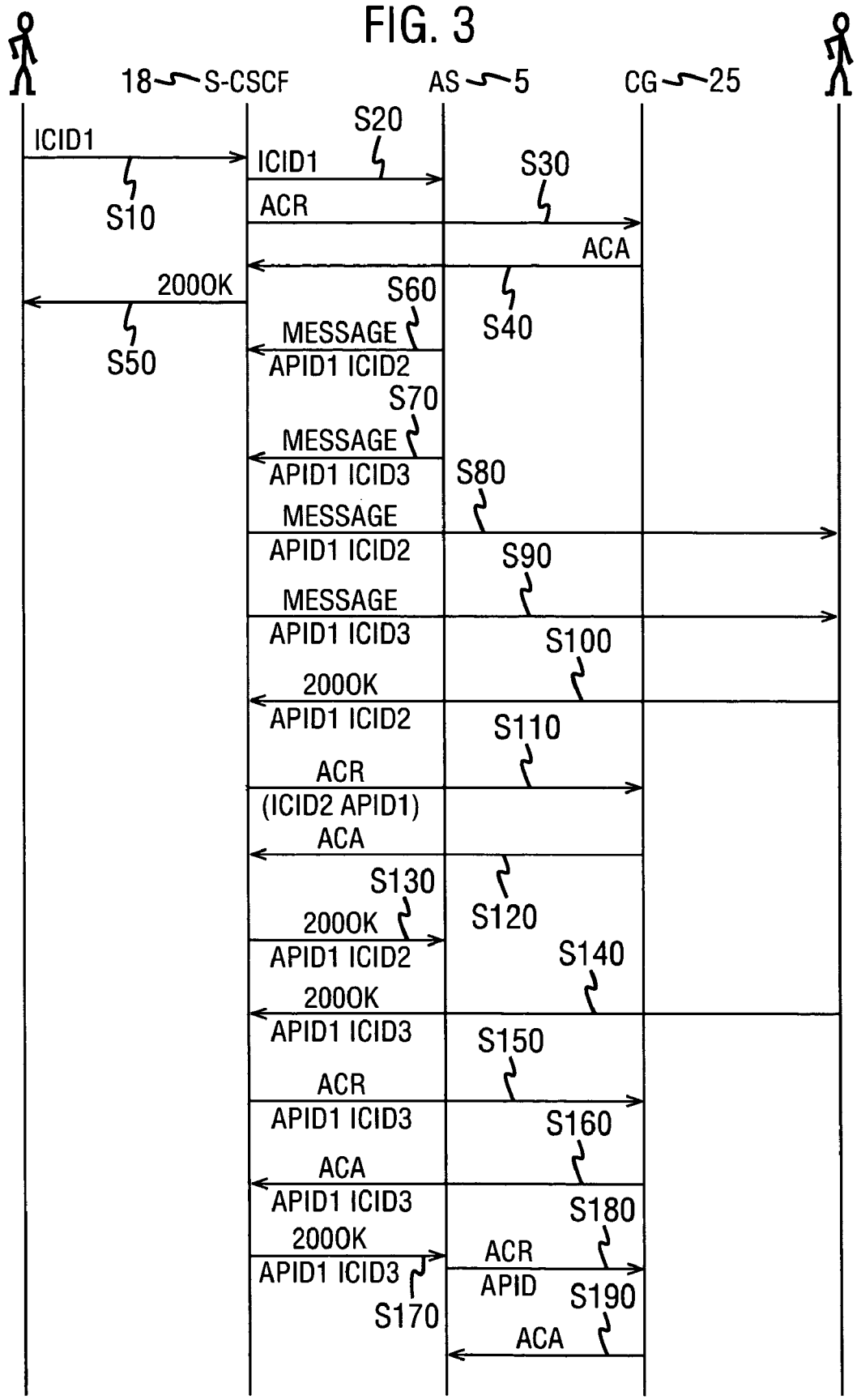

CHARGING IN A COMMUNICATION SYSTEM

FIELD OF INVENTION

This invention relates to charging for services in a communication system such as a mobile telephony system.

BACKGROUND OF INVENTION

In a basic communication system a simple communication network is provided, which can link together two communication terminals so that the terminals can communicate with each other in a communication session or call. Conventionally, a designated entity in the network uses a stored tariff to determine a charge for a call based on the call's duration, or for a service based on the service provided. Each terminal user has a charging account with the operator of the network. The charge for a call is then allocated to the charging account of the user of the terminal that originated the call.

The 3G Partnership Project (3GPP) is defining a reference architecture for the Universal Mobile Telecommunication System (UMTS) core network which will provide the users of user equipment (UE) with access to various services. This UMTS core network is divided into three principal domains. These are the Circuit Switched domain, the Packet Switched domain and the Internet Protocol Multimedia Subsystem (IMS) domain.

The IMS network makes sure that multimedia services are adequately managed. The IMS network supports the Session Initiation Protocol (SIP) as developed by the Internet Engineering Task Force (IETF). SIP is an application layer signalling protocol for starting, changing and ending user sessions. A session may, for example, be a two-way telephone call or a connection between a user and an application server (AS). The establishment of these sessions enables a user to be provided with services. One of the basic features of SIP is that the protocol enables personal mobility of a user using mobile UE by providing the capability to reach a called party (which can be an application server AS) via a single location independent address.

For third generation (3G) communication systems the systems of more than one operator may be used for carrying a call and operators of all of those systems may be able to levy charges independently for the services they provide in supporting the call. In an IMS network charging functionality is based on the IMS network nodes reporting accounting information in messages that include an IMS charging identity (ICID). The ICID provides a unique identifier for each call, which enables charges for a single call to be made to the correct account by a number of operators. Accordingly, current charging functionality employing the use of ICID only relates to charging for a single call or connection.

It is possible however, for a user to simultaneously establish communication with more than one destination. For example using the explode mechanism, it is possible for a user to send a message to a plurality of destinations. An explode indication could be inserted to various SIP methods (e.g. MESSAGE). To send an SIP message to multiple destinations, the SIP message includes a URI (Universal Resource Indicator) list specifying the destinations. A Request-URI of the message contains a 'list' parameter that points to the part of the message that carries the URI list. A specialised application server receives the request and sends a similar message to each of the URIs in the list. Each of these messages contains a copy of the payload included in the original message.

There is currently no feasible solution for efficiently managing charging for a session including use of a plurality of resources based on the use of ICIDs. The present invention aims to provide such a solution. A further aim of the present invention is to provide a way of managing charging when a plurality of different messages are generated in a single session.

SUMMARY OF THE INVENTION

According to a first aspect of the present invention there is provided a method of charging in a communications network, said method comprising: including a first charging identity in at least one of a plurality of messages relating to a service, said first charging identity being specific to said at least one message; including a second charging entity in said at least one message, said second charging identity being specific to said service; charging for said service based on at least one of said first and second charging identities.

According to a second aspect of the present invention there is provided communication system configured to provide at least one chargeable service, said system comprising: a first node configured to include a first charging identity in at least one of a plurality of messages relating to a service, said first charging identity being specific to said at least one message; and to include a second charging identity in said at least one message said second charging identity being specific to said service; and a second node arranged to charge for said service based on at least one of said first and second charging identities.

According to a third aspect of the present invention there is provided a node for a communication system wherein a first charging identity is included in at least one of a plurality of messages relating to a service, said node being configured to include a second charging identity in said at least one message, said second charging identity being specific to said service.

BRIEF DESCRIPTION OF DRAWINGS

Embodiments of the present invention will now be described by way of example only with reference to the accompanying drawings, in which:

FIG. 3 is a signalling diagram showing steps of a method in accordance with an alternative embodiment of the present invention.

DETAILED DESCRIPTION OF EMBODIMENTS OF THE INVENTION

Reference is first made to a cellular telecommunication system in which embodiments of the present invention may be implemented, however the present invention is not limited for use in a cellular system. In cellular system base stations of the cellular system provide radio coverage areas i.e. cells. Each radio coverage area is typically served by a base station. It should be appreciated that one cell may include more than one base station site. A base station apparatus or site may also provide more than one cell. The shape and size of the cells depend on the implementation. It should be appreciated that in some systems the base station may be referred to as Node B.

It shall be appreciated that typically a number of user equipment will be in communication with each base station. Each base station is arranged to transmit signals to and receive signals from the mobile user equipment (UE) via a wireless interface. Likewise, each UE is able to transmit signals to and receive signals from the base station.

Figure 1:
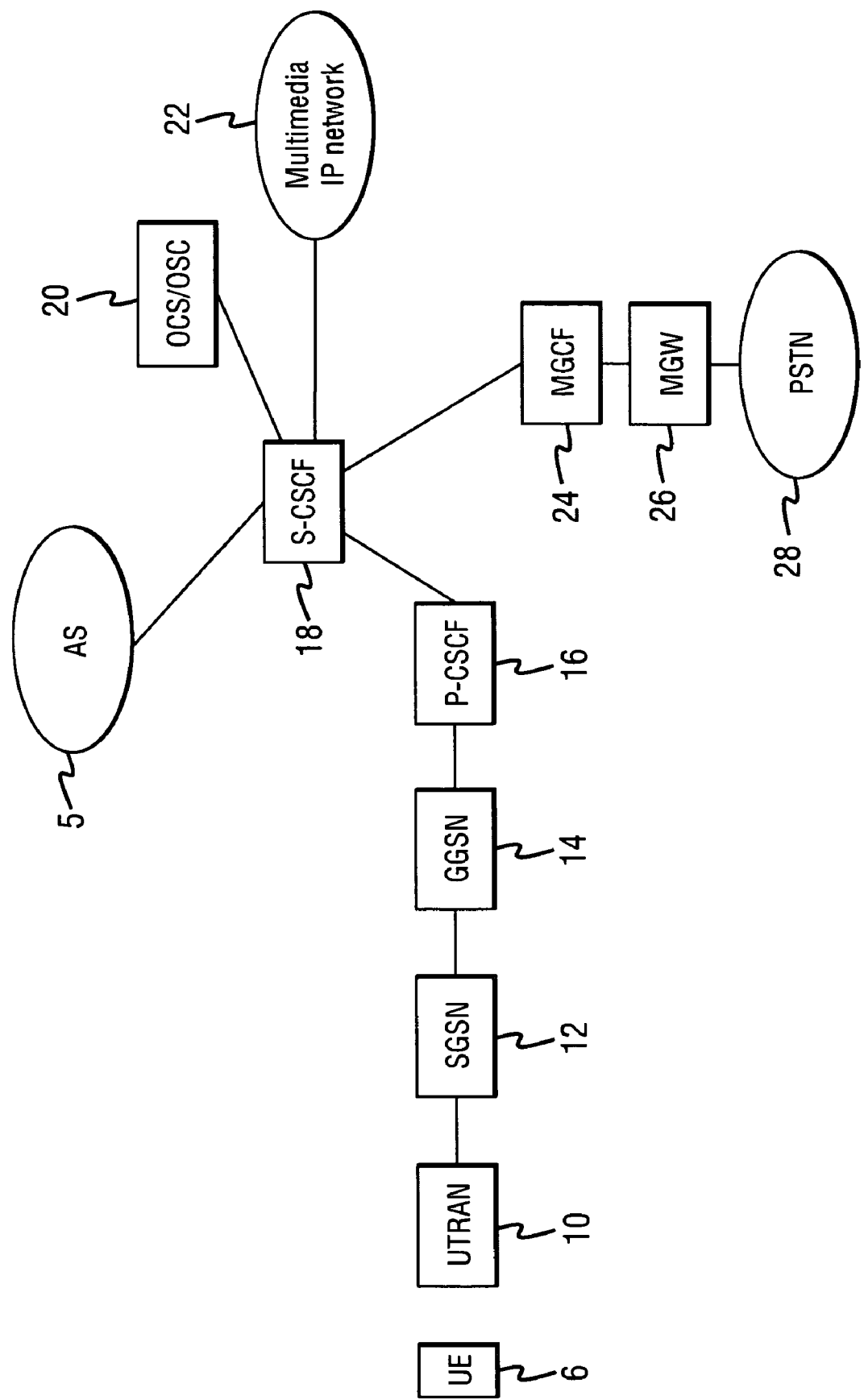
FIG. 1 is a schematic diagram of a communication network.

Each of the base stations is connected to an access network controller such as a radio network controller of a UMTS terrestrial radio access network (UTRAN) 10, shown in FIG. 1. The radio network controller may be connected to appropriate core network entities of the cellular system, such as an SGSN 12 (serving general packet radio service support node) for packet switched communication and additionally an MSC (mobile switching centre) for circuit switched communication.

FIG. 1 depicts the architecture of a UMTS IMS network. In the system of FIG. 1, the UE 6 can communicate with the IMS network via radio interface. By this means the UE can communicate with other UEs that are connected directly to the IMS network or are connected to other networks that are connected to the IMS network. The UEs can also receive applications and services from application server (AS) 5.

The core network section of the network includes an SGSN (serving GPRS support node) 12, a GGSN (gateway support node) 14, a P-CSCF (Proxy Call State Control Function) 16 and an S-CSCF (Serving Call State Control Function) 18. In addition the network has an OCS (Online Changing System) 20, such as the Online Service Controller (OSC) provided by Nokia. The OCS is responsible for collecting data on charges for the subscriber of the UE of the network. Each network may include a number of OCSs each of which serves a subset of subscribers to that network.

As shown in FIG. 1, the S-CSCF 18 is connected directly to the Multimedia IP Network 22. The S-CSCF may also be connected to the PSTN 28 via the MGCF (Media Gateway Control Function) 24, and MGW (Media Gateway) 26.

Operators may choose to offer prepaid and/or postpaid services. For prepaid services, on-line charging is used. On-line charging is a process where a subscriber's account is debited in real time when a service is requested. Conversely, for postpaid services a subscriber's account is debited after the service has been provided to the subscriber, using off line charging methods.

Figure 2:
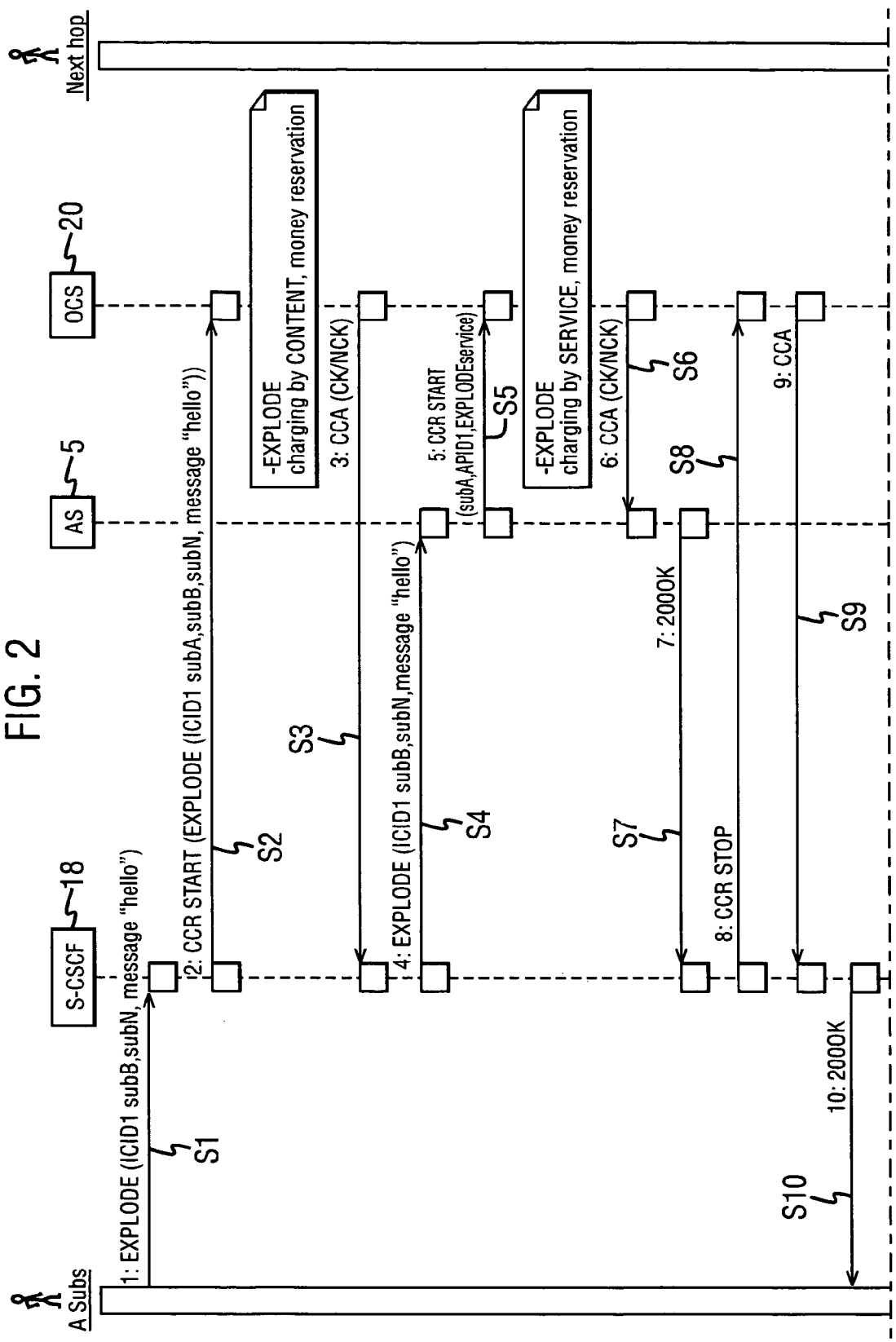
FIG. 2 is a signalling diagram showing steps of a method in accordance with an embodiment of the present invention.

An embodiment of the present invention will first be discussed in relation to prepaid services. In order to use the services of the communications system with a prepaid SIM card for example, the associated prepay account must be in credit in advance of using the services. FIG. 2 shows a signalling diagram showing steps of a method in accordance with an embodiment of the present invention.

In step S1 an SIP message, hereinafter referred to as the incoming SIP message, is sent from the UE of a subscriber A over the IMS network via P-CSCF 16 to S-CSCF 18. The incoming SIP message will include a first charging identity ICID1 which is inserted by the P-CSCF16, a subscriber ID, e.g. the MSIDN (Mobile Station IDSN Number) and a special message body. The incoming SIP message body includes: information that indicates that an SIP message should be sent—this is provided by the presence of a 'list' parameter included in a Request URI in the message; the payload of the SIP message, e.g. 'hello', and a URI list, listing the destinations of where to send the SIP message.

Steps 2 and 3 carry out SIP credit reservation in the known manner. In step S2, the S-CSCF sends a Credit Control Request (CCR) message to the OCS 20, containing the first charging identity ICID1. This message starts a credit control session in the OCS. The message will also contain information relating to the incoming SIP message payload and the identity of the subscriber. The message may also contain the list of destinations of the SIP message. The credit control session started in step 2 relates to charging for the transmitting a message with the payload of the SIP message, regardless of the SIP method used. The S-CSCF 18 may access a Home Subscriber Server (HSS) (not shown) to determine the identity of the OCS 20 associated with the subscriber of UE 6.

In step S3, the OCS 20 will check that the subscriber of the user equipment has sufficient credit in their account to send the message. The OCS will then send a Credit Control Answer (CCA) message to the S-CSCF 18 confirming whether or not there is sufficient credit in the subscribers account.

If it is determined that there is sufficient credit in the subscribers account, in step S4 the incoming SIP message is forwarded from the S-CSCF 18 to AS 5 which will later perform the actual EXPLODE service. On receipt of the incoming SIP message the AS generates APID1 (Application service specific ID) for correlation purposes.

In step S5, the AS 5 sends a CCR message to the OCS 20, containing both the application service specific ID APID1, the first charging ID ICID1 and the subscriber ID. This message starts a credit reservation session for the EXPLODE service identified by the APID1. The credit reservation made in step 2 only relates to charging for the EXPLODE service.

In step S6, the OCS 20 will check that the subscriber of the user equipment has sufficient credit in their account to pay for the EXPLODE service. The OCS will then send a CCA message to the AS 5 confirming whether or not there is sufficient credit in the subscribers account.

If the EXPLODE service is charged using an event based method, the subscriber's account is also debited during step 6.

If it is determined that there is sufficient credit in the subscribers account, in step S7 the AS sends a message 200OK to S-CSCF confirming that there is sufficient credit in the subscribers account and that the EXPLODE service will be carried out. The APID, ICID1 and subscriber ID are included in the 200OK message.

Upon receiving confirmation, in step 8 the S-CSCF sends a message CCR STOP instructing the OCS to close the credit control session started in step 2 and to debit the subscribers account for transmitting the incoming SIP message.

In step 9 the OCS sends a message to the S-CSCF indicating that the subscribers account has been debited Upon receiving the message confirming that the subscribers account has been debited in respect of transmitting the incoming SIP in step 10 the S-CSCF forwards 200OK message to the subscriber via P-CSCF 16, indicating that the EXPLODE service will be performed.

In step S11 the AS performs the EXPLODE service by creating the SIP messages according to the instructions included in the incoming SIP message. The SIP messages created by the AS according to the instructions included in the incoming SIP message shall hereinafter be referred to as outgoing SIP messages. The AS will create as many outgoing SIP messages as there are destinations in the URI list. Each outgoing SIP message should include a copy of the payload of the incoming SIP message which may include text messages, images etc. The Request URI of each of the outgoing SIP message will not include any list parameters, however a copy the URI list may be provided in the outgoing SIP message.

The same application ID, APID1, is inserted into each outgoing SIP message. In addition to containing a common application ID, APID1, each outgoing SIP message is given a different ICID value. The AS generates a different charging ID for each outgoing SIP message, these shall be referred to as ICID2, ICID3, ICID4 . . . up to ICID(n+1) for the final, nth, outgoing SIP message to be sent according to the incoming SIP message. The destination of each outgoing SIP message is read from the URI list included in the incoming SIP message. The destination of each outgoing SIP message is also included in the message before each outgoing SIP message is forwarded to the S-CSCF which will later route the messages towards the destinations. The AS will continue to send each outgoing SIP message to the S-CSCF until in step S12 the nth outgoing SIP message is sent to the S-CSCF.

In step s13, the S-CSCF 18 sends a CCR message to the OCS 20, in order to start a credit reservation session for the transmission of the first outgoing SIP message to be sent to the destination specified in the incoming SIP message. The request contains the APID1, the ICID of the first outgoing SIP message ICID2 and the identity of the subscriber.

In step S14, the OCS 20 will check that the subscriber of the user equipment has sufficient credit in their account to pay for the transmission of the first SIP message. The OCS will then send a CCA message to the S-CSCF 18 confirming whether or not there is sufficient credit in the subscribers account.

On receipt of confirmation sent at step S14, in step S15 the first outgoing SIP message which includes charging ID ICID2 and application ID APID1 is sent from the S-CSCF towards the destination defined in the incoming SIP message.

In step s16, the S-CSCF 18 sends a CCR message to the OCS 20, in order to start a credit control session for the transmission of the second outgoing SIP message to be sent to the destination specified in the incoming SIP message. The request contains APID1, the charging ID of the second outgoing SIP message ICID3 and the subscriber ID.

In step S17, the OCS 20 will check that the subscriber of the user equipment has sufficient credit in their account to pay for the transmission of the second outgoing SIP message. The OCS will then send a CCA message to the S-CSCF 18 confirming whether or not there is sufficient credit in the subscribers account.

On receipt of confirmation sent at step S17, in step S18 the second outgoing SIP message, which includes charging ID ICID3 and application ID APID1, is sent from the S-CSCF towards the destination defined in the incoming SIP message.

The S-CSCF continues to reserve credit and route the remaining outgoing SIP messages to the destinations specified in the incoming SIP message until all the outgoing SIP messages are sent or the until the subscriber no longer has sufficient credit to route further outgoing SIP messages.

At step S19 a 200OK message is sent from the next hop to receive the first outgoing SIP message, to the S-CSCF confirming that it has received the message. In FIG. 2 the next hop is the next node that routes the message towards the destination, however in an alternative embodiment of the invention confirmation could be provided by the destination.

Upon receiving confirmation, in step 20 the S-CSCF sends a message CCR STOP including the application ID APID1, the charging ID ICID2, and the subscriber ID, instructing the OCS to debit the subscribers account for transmission of the first outgoing SIP message.

In step 21 the OCS sends a CCA message to the S-CSCF indicating that the subscribers account has been debited.

Upon receiving the CCA message confirming that the subscribers account has been debited in respect of transmitting the first outgoing SIP message, in step 22 the S-CSCF forwards the 200OK message including the APID1 and ICID2 to the AS 5, indicating that the first outgoing SIP message has been successfully routed towards the destination.

At step S23 a 200OK message is sent from the next hop to receive the second SIP message, to the S-CSCF confirming that it has received the message. Again the 200OK message includes the APID1 and the charging ID of the second outgoing SIP message ICID3.

Upon receiving confirmation, in step S24 the S-CSCF sends a message CCR STOP including the application ID APID1, the charging ID ICID3, and the subscriber ID instructing the OCS to debit the subscribers account for transmission of the second SIP message.

In step S25 the OCS sends a message to the S-CSCF indicating that the subscribers account has been debited.

Upon receiving the message confirming that the subscribers account has been debited in respect of transmitting the second SIP message, in step 26 the S-CSCF sends a 200OK message including the APID1 and ICID3 to the AS 5.

The process as defined in steps S23 to S26 is repeated in relation to the remaining outgoing SIP messages sent according to the incoming SIP message.

In accordance with one embodiment of the present invention, the OCS identifies each CCR including the same application ID APID1. Although the S-CSCF sends separate CCR STOP messages to the OCS for each outgoing SIP message, the OCS may then adjust the amount debited in from the users account in accordance with network operator pricing plans. For example, the number of successfully transmitted messages may affect the actual price of the service.

Since the 200OK message sent in respect of each outgoing SIP message includes the application ID APID1, the AS is able to associate each 200OK message received with the EXPLODE service that generated each outgoing SIP message. In this case information relating to the EXPLODE service, for example the number of outgoing SIP messages generated, is stored together with the application ID, ADIP1 in the AS. The AS is therefore able to determine whether the number of 200OK messages including the application ID APID1 is equal to the number of outgoing SIP messages generated by the associated EXPOLDE service. This information may be stored until the AS determines that all of the outgoing SIP messages have been sent, or until step 28 described hereinafter Accordingly when the AS receives the 200OK message confirming transmission of the final SIP message which includes APID1 and the ICID for that outgoing SIP message, the AS may determine that the EXPLODE service is complete. It is noted that the 200OK messages relating to successful transmission of each outgoing SIP message may be received in any order, for example the 200OK message including ICID2 may be received after the 200OK message which includes ICID4. If the AS does not receive a 200OK message for each outgoing SIP message after a predetermined time, the network operator may configure the AS to take appropriate action, for example to resend the messages.

In an alternative embodiment to receiving the 200OK message at step 22, the AS may be configured to receive any appropriate confirmation of successful transmission of each SIP message from the node which receives each outgoing SIP message. This may be any appropriate final or other response.

In an alternative embodiment of the present invention the payment for the EXPLODE service paid for after the SIP messages are successfully routed to their destination and steps S8 and S9 are not carried out. Instead the subscribers account is debited in steps S27-S28, as set out below.

In step S27, on receipt of the 200OK message relating to the final SIP message indicating that the EXPLODE service is complete, the AS 5 sends a message CCR STOP including the APID1 instructing the OCS to debit the subscribers account for the EXPLODE service.

In step 28 the OCS sends a message to the AS indicating that the subscribers account has been debited.

In an alternative embodiment of the present invention, postpaid charging is used. In this case the user may have a contract with the network operator by which the user may pay for a service after they have used the service. FIG. 3 shows a signalling diagram in accordance with an embodiment of the present invention when postpaid charging is used.

In FIG. 3, the OCS 20 referred to in FIG. 2 is replaced by a CG (Charging Gateway) 25. The remaining elements of the arrangement shown in FIG. 3 are the same as those described in relation to FIG. 2 and are referred to with like reference numerals.

In step S10 an SIP message, hereinafter referred to as the incoming SIP message, is sent from the UE of a subscriber A over the IMS network via P-CSCF 16 to S-CSCF 18. The incoming SIP message will include a first charging identity ICID1 which is inserted by the P-CSCF16, a subscriber ID, and a message body. The incoming SIP message body includes: information that indicates that an SIP message should be sent—as described above this is provided by the presence of a 'list' parameter included in a Request URI in the message; the payload of the SIP message, e.g. 'hello'; and a URI list, listing the destinations of where to send the SIP message.

In step S20 the incoming SIP message is forwarded from the S-CSCF 18 to AS 5 which will later perform the actual EXPLODE service. On receipt of the incoming SIP message the AS generates APID1 (Application service specific ID) for correlation purposes.

In step S30 the S-CSCF sends a message ACR (Accounting Request) instructing the CG to charge the subscribers account for transmitting the incoming SIP message to the AS.

In step S40 the CG sends an ACA (Accounting Answer) message to the S-CSCF indicating that the subscribers account will be charged.

Upon receiving the message confirming that the subscribers account will be charged in respect of transmitting the incoming SIP message, in step S50 the S-CSCF forwards a 200OK message to the subscriber via P-CSCF 16, indicating that the EXPLODE service will be performed.

In step S60 the AS performs the EXPLODE service by creating the SIP messages according to the instructions included in the incoming SIP message. The SIP messages created by the AS according to the instructions included in the incoming SIP message shall hereinafter be referred to as outgoing SIP messages. The AS will create as many outgoing SIP messages as there are destinations in the URI list. Each outgoing SIP message should include a copy of the payload of the incoming SIP message which may include text messages, images etc. The Request URI of each of the outgoing SIP message will not include any list parameters, however a copy the URI list may be provided in the outgoing SIP message.

The same application ID, APID1, is inserted into each outgoing SIP message. In addition to containing a common application ID, APID1, each outgoing SIP message is given a different ICID value. The AS generates a different charging ID for each outgoing SIP message, these shall be referred to as ICID2, ICID3, ICID4 . . . up to ICID(n+1) for the final, nth, outgoing SIP message to be sent according to the incoming SIP message. The destination of each outgoing SIP message is read from the URI list included in the incoming SIP message. The destination of each outgoing SIP message is also included in the message before each outgoing SIP message is forwarded to the S-CSCF which will later route the messages towards the destinations. The AS will continue to send each outgoing SIP message to the S-CSCF until in step S70 the nth outgoing SIP message is sent to the S-CSCF.

In step S80 the first outgoing SIP message which includes charging ID ICID2 and application ID APID1 is sent from the S-CSCF towards the destination defined in the incoming SIP message.

In step S90 the second outgoing SIP message which includes charging ID ICID3 and application ID APID1 is sent from the S-CSCF towards the destination defined in the incoming SIP message.

The S-CSCF continues to route the remaining outgoing SIP messages to the destinations specified in the incoming SIP message until all the SIP messages are sent.

At step S100 a 200OK message is sent from the next hop to receive the first outgoing SIP message, to the S-CSCF confirming that it has received the message. In FIG. 3 the next hop is the next node that routes the message towards the destination, however in an alternative embodiment of the invention confirmation could be provided by the destination.

Upon receiving confirmation, in step S110 the S-CSCF sends an ACR (Accounting Request) message including the application ID APID1, the charging ID ICID2, and the subscriber ID, instructing the CG to charge the subscribers account for transmission of the first outgoing SIP message.

In step S120 the CG sends an ACA message to the S-CSCF indicating that the subscribers account will be charged for transmission of the first outgoing SIP message.

Upon receiving the ACA message confirming that the subscribers account has will be charged in respect of transmitting the first outgoing SIP message, in step S130 the S-CSCF forwards the 200OK message including the APID1 and ICID2 to the AS 5, indicating that the first outgoing SIP message has been successfully routed towards the destination.

At step S140 a 200OK message is sent from the next hop to receive the second outgoing SIP message, to the S-CSCF confirming that it has received the message. Again the 200OK message includes the APID1 and the charging ID of the second outgoing SIP message ICID3.

Upon receiving confirmation, in step S150 the S-CSCF sends a message ACR including the application ID APID1, the charging ID ICID3, and the subscriber ID instructing the CG to charge the subscribers account for transmission of the second outgoing SIP message.

In step S160 the CG sends a message to the S-CSCF indicating that the subscribers account will be charged.

Upon receiving the message confirming that the subscribers account will be charged in respect of transmitting the second SIP message, in step S170 the S-CSCF sends a 200OK message including the APID1 and ICID3 to the AS 5.

The process as defined in steps S140 to S170 is repeated in relation to the remaining outgoing SIP messages sent according to the incoming SIP message.

In step S180, on receipt of the 200OK message relating to the nth outgoing SIP message indicating that the EXPLODE service is complete, the AS 5 sends a ACR message including the APID1 instructing the CG to charge the subscribers account for the EXPLODE service.

In step S190 the CG sends a message to the AS indicating that the subscribers account has been charged in respect of the EXPLODE service.

In accordance with one embodiment of the present invention, the CG identifies each ACR including the same application ID APID1. Although the S-CSCF sends separate ACR messages to the CG for each outgoing SIP message, the CG may then adjust the amount charged to the users account in accordance with network operator pricing plans. For example, the number of successfully transmitted messages may affect the actual price of the service.

Also, since the 200OK message sent in respect of each outgoing SIP message includes the application ID APID1, the AS is able to associate each 200OK message received with the EXPLODE service that generated each outgoing SIP message. The AS is therefore able to determine whether the number of 200OK messages including the application ID APID1 is equal to the number of outgoing SIP messages generated by the associated EXPOLDE service. Accordingly when the AS receives the 200OK message confirming transmission of the final SIP message which includes APID1 and the ICID for that outgoing SIP message, the AS may determine that the EXPLODE service is complete.

The required data processing functions may be provided by means of one or more data processor entities. Appropriately adapted computer program code product may be used for implementing the embodiments, when loaded to a computer, for example for generating the identities and for analysing information.

The data processing may be provided by data processing means in the application server 5 or data processing means external to the application server.

The program code product may be stored on and provided by means of a carrier medium such as a carrier disc, card or tape. A possibility is to download the program code product via a data network.

Embodiments of the present invention have been described with specific reference to the UMTS and GPRS systems. However, it is not limited to these systems, but can be applied to any communication system which enables the provision of services to a client.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of charging in a communications network, said method comprising:
   receiving a message from a user equipment of a computing device a first node, wherein the message is addressed to a plurality of destinations;
   generating, at the computing device of the first node, a plurality of messages corresponding to the plurality of destinations;
   including a first charging identity in a first message of the plurality of messages at the computing device of the first node, wherein the first charging identity is specific to said first message;
   including, at the computing device of the first node, a second charging identity in said first message or in a second message, wherein the second charging identity is specific to the plurality of messages, and wherein said second charging identity corresponds to a service that generates the plurality of messages and that is performed at the first node; and
   providing at least one of said first charging identity or said second charging identity to a charging system such that a charge is incurred for a delivery of the first message or the second message.

2. The method as claimed in claim 1, further comprising generating the first charging identity and the second charging identity at a first network node.

3. The method as claimed in claim 2, further comprising charging a subscriber corresponding to one or more of the first or second charging identities via a second network node.

4. The method as claimed in claim 3, further comprising sending an instruction to the second network node to perform said charging.

5. The method as claimed in claim 4, further comprising sending said instruction from a third network node.

6. The method as claimed in claim 4, wherein said instruction includes at least one of said first charging identity or said second charging identity.

7. The method as claimed in claim 1, further comprising:
   including a third charging identity in a third message of the plurality of messages, wherein the third charging identity is specific to said third message;
   including the second charging identity in said third message; and
   providing at least one of said third charging identity or said second charging identity to the charging system such that a second charge corresponding to the third message is incurred.

8. The method as claimed in claim 1, further comprising:
   including a payload from the received message in said first message.

9. The method as claimed in claim 8, wherein the payload comprises at least one of a text message or an image.

10. The method as claimed in claim 2, further comprising sending a confirmation of the delivery of the first message to the first network node.

11. The method as claimed in claim 10, wherein said confirmation includes at least one of said first charging identity or said second charging identity.

12. The method as claimed in claim 1, wherein the received message is a session initiation protocol message, and further wherein the session initiation protocol message includes a list of the plurality of destinations.

13. The method as claimed in claim 1, wherein the charging system uses postpaid charging.

14. A communication system configured to provide a chargeable service, said system comprising:
   a first node including a computing device configured to receive a message addressed to a plurality of destinations;
   generate a plurality of messages corresponding to the plurality of destinations;
   include a first charging identity in a first message of the plurality of messages, wherein the first charging identity is specific to said first message; and
   include a second charging identity in said first message or in a second message, wherein said second charging identity is specific to the plurality of messages, and wherein said second charging identity corresponds to a service that generates the plurality of messages and that is performed at the first node; and
   a second node configured to charge for a delivery of the first message or the second message based on at least one of said first charging identity or said second charging identity.

15. The system as claimed in claim 14, wherein said first node is further configured to generate the first charging identity and the second charging identity.

16. The system as claimed in claim 14, wherein the second node is further configured to receive an instruction to charge for the delivery of the first message.

17. The system as claimed in claim 16, further comprising a third node configured to send said instruction.

18. The system as claimed in claim 16, wherein said instruction includes at least one of said first charging identity or said second charging identity.

19. The system as claimed in claim 14, wherein the received message is received from a user equipment.

20. The system as claimed in claim 14, wherein the first node is further configured to perform an explode operation on the received message to generate the plurality of messages.

21. The system as claimed in claim 20, wherein the received message includes a payload, and further wherein the first node is configured to include the payload in the first message.

22. The system as claimed in claim 14, wherein the first node is further configured to receive a confirmation of the delivery of the first message.

23. The system as claimed in claim 22, wherein the confirmation includes at least one of said first charging identity or said second charging identity.

24. The system as claimed in claim 14, wherein an amount charged for the delivery is based at least in part on a number of the plurality of messages.

25. The system as claimed in claim 14, wherein said first node comprises an application server.

26. The system as claimed in claim 14, wherein said second node comprises at least one of a charging gateway or an online charging system.

27. The system as claimed in claim 17, wherein said third node comprises a serving call state control function.

28. The system as claimed in claim 25, wherein the second identifier comprises an application identifier corresponding to the application server.

29. A non-transitory computer-readable medium having instructions thereon that, if executed by a computing device, cause the computing device to perform operations comprising:
    receiving a message from a user equipment, wherein the message is addressed to a plurality of destinations;
    generating a plurality of messages corresponding to the plurality of destinations;
    including a first charging identity in a first message of the plurality of messages, wherein the first charging identity is specific to said first message;
    including a second charging identity in said first message or in a second message, wherein the second charging identity is specific to the plurality of messages, and wherein said second charging identity corresponds to a service that generates the plurality of messages and that is performed at the apparatus; and
    providing the first charging identity and said second charging identity to a charging system such that a charge is incurred for a delivery of the first message or the second message to a first destination of the plurality of destinations.

30. A communications network, said communication network comprising:
    first means for receiving a message from a user equipment at a first node, wherein the message is addressed to a plurality of destinations;
    second means for generating a plurality of messages corresponding to the plurality of destinations at the first node;
    third means for including a first charging identity in a first message of the plurality of messages, wherein the first charging identity is specific to the first message;
    fourth means for including a second charging identity in the first message or in a second message, wherein the second charging identity is specific to the plurality of messages, and wherein said second charging identity corresponds to a service that generates the plurality of messages and that is performed at the first node; and
    fifth means for charging for a delivery of the first message or the second message, wherein the charging is based on at least one of said first charging identity or said second charging identity.

31. The system as claimed in claim 20, wherein the service associated with the plurality of messages and performed at the first node is the explode operation.

\* \* \* \* \*

UNITED STATES PATENT AND TRADEMARK OFFICE
CERTIFICATE OF CORRECTION

PATENT NO. : 8,090,667 B2
APPLICATION NO. : 10/976895
DATED : January 3, 2012
INVENTOR(S) : Vallinen et al.

It is certified that error appears in the above-identified patent and that said Letters Patent is hereby corrected as shown below:

On the Title page, Item (75), under "Inventors", Line 2,
delete "Hämcenlinna (FI)" and insert -- Hämeenlinna (FI) --, therefor.

In Column 3, Lines 24-25, delete "GGSN (gateway support node)" and insert -- GGSN (gateway GPRS support node) --, therefor.

In Column 3, Line 63, delete "2 and 3" and insert -- S2 and S3 --, therefor.

In Column 4, Line 4, delete "2" and insert -- S2 --, therefor.

In Column 4, Line 26, delete "2" and insert -- S2 --, therefor.

In Column 4, Line 33, delete "6." and insert -- S6. --, therefor.

In Column 4, Line 40, delete "8" and insert -- S8 --, therefor.

In Column 4, Line 42, delete "2" and insert -- S2 --, therefor.

In Column 4, Line 44, delete "9" and insert -- S9 --, therefor.

In Column 4, Line 45, delete "debited" and insert -- debited. --, therefor.

In Column 4, Line 48, delete "10" and insert -- S10 --, therefor.

In Column 5, Line 11, delete "s13," and insert -- S13, --, therefor.

In Column 5, Line 26, delete "s16," and insert -- S16, --, therefor.

In Column 5, Line 53, delete "20" and insert -- S20 --, therefor.

Signed and Sealed this
Twenty-sixth Day of June, 2012

David J. Kappos
*Director of the United States Patent and Trademark Office*

CERTIFICATE OF CORRECTION (continued)
U.S. Pat. No. 8,090,667 B2

In Column 5, Line 58, delete "21" and insert -- S21 --, therefor.

In Column 5, Line 62, delete "22" and insert -- S22 --, therefor.

In Column 6, Line 14, delete "26" and insert -- S26 --, therefor.

In Column 6, Line 39, delete "28" and insert -- S28 --, therefor.

In Column 6, Line 40, delete "hereinafter" and insert -- hereinafter. --, therefor.

In Column 6, Line 54, delete "22," and insert -- S22, --, therefor.

In Column 7, Line 1, delete "28" and insert -- S28 --, therefor.

In Column 8, Line 56, delete "a ACR" and insert -- an ACR --, therefor.

In Column 10, Line 28, in Claim 10, delete "in 2," and insert -- in claim 2, --, therefor.